(12) United States Patent
Fredley

(10) Patent No.: US 12,173,626 B1
(45) Date of Patent: Dec. 24, 2024

(54) POWER PLANT

(71) Applicant: Joseph E. Fredley, Bellefonte, PA (US)

(72) Inventor: Joseph E. Fredley, Bellefonte, PA (US)

(*) Notice: Subject to any disclaimer, the term of this patent is extended or adjusted under 35 U.S.C. 154(b) by 0 days.

(21) Appl. No.: 18/312,646

(22) Filed: May 5, 2023

(51) Int. Cl.
| | | |
|---|---|---|
| *F01K 25/10* | (2006.01) | |
| *F01K 7/16* | (2006.01) | |
| *F01K 13/02* | (2006.01) | |
| *F02C 1/10* | (2006.01) | |
| *F02C 9/24* | (2006.01) | |

(52) U.S. Cl.
CPC ............ *F01K 25/103* (2013.01); *F01K 7/165* (2013.01); *F01K 13/02* (2013.01); *F02C 1/10* (2013.01); *F02C 9/24* (2013.01)

(58) Field of Classification Search
CPC . F01K 25/103; F01K 7/32; F01K 3/22; F01K 7/165; F01K 13/02; F02C 1/10; F02C 9/24; F02C 1/00–105
See application file for complete search history.

(56) References Cited

U.S. PATENT DOCUMENTS

| | | | | |
|---|---|---|---|---|
| 3,895,492 A * | 7/1975 | Forster | ...................... | F02C 1/10 |
| | | | | 60/659 |
| 4,572,110 A * | 2/1986 | Haeflich | ............... | F01K 23/108 |
| | | | | 122/448.3 |
| 7,293,414 B1 * | 11/2007 | Huber | ....................... | F02C 1/06 |
| | | | | 60/682 |
| 2007/0240420 A1 * | 10/2007 | Bronicki | ................. | F01K 25/08 |
| | | | | 60/671 |
| 2013/0036736 A1 * | 2/2013 | Hart | ........................ | F01K 3/185 |
| | | | | 60/645 |
| 2013/0133335 A1 * | 5/2013 | Graf | ...................... | F16H 47/085 |
| | | | | 60/670 |
| 2014/0102101 A1 * | 4/2014 | Xie | ........................ | F01K 25/103 |
| | | | | 60/647 |
| 2016/0195017 A1 * | 7/2016 | Vick | .......................... | F02C 7/08 |
| | | | | 60/39.511 |
| 2018/0187595 A1 * | 7/2018 | Apte | ......................... | F02C 1/05 |
| 2020/0200049 A1 * | 6/2020 | Ryu | ........................ | F02B 37/12 |

FOREIGN PATENT DOCUMENTS

| | | | |
|---|---|---|---|
| CN | 111677571 A | * | 9/2020 |
| KR | 20200084112 A | * | 7/2020 |

* cited by examiner

*Primary Examiner* — Mark A Laurenzi
*Assistant Examiner* — Xiaoting Hu
(74) *Attorney, Agent, or Firm* — John J. Elnitski, Jr.

(57) ABSTRACT

A rotational power plant using a working fluid in a closed-cycle path. The power plant has a single-shaft, compressor and turbine connected together along the path. There is heat source heat exchanger within the path moving from the compressor to the turbine. There is a heat sink and heat exchanger within the path from the turbine to the compressor. There is an Automated Fluid Inventory Management System (AFIMS). The AFIMS includes sensors to measure temperature and pressure of the working fluid at different locations within the path. There is an electronic control unit connected to the AFIMS.

4 Claims, 5 Drawing Sheets

| Function | Valve Position | | | | | | Positive Displacement Compressor Status |
|---|---|---|---|---|---|---|---|
| | V1 | V2 | V3 | V4 | V5 | V6 | |
| 1 Inject mass from Reservoir | O | C | C | C | C | C | Off |
| 2 Pump mass from Reservoir | C | O | O | C | C | C | On |
| 3 Pump mass from Precooler HX inlet | C | O | C | O | C | C | On |
| 4 Refill Reservoir with Positive Displacement Compressor | C | C | O | O | O | C | On |
| 5 Refill Reservoir without Positive Displacement Compressor | C | C | C | O | C | C | Off |
| 6 Move mass from Recuperator HX exit (high pressure side) to Recuperator HX inlet (low pressure side) | C | C | C | C | C | O | Off |

O – Open    C – Closed

Fig. 4

| Pedal Position (% depressed) | Target Turbine Inlet Pressure (psia) |
|---|---|
| 0 | 30 |
| 10 | 40 |
| 20 | 60 |
| 30 | 100 |
| 40 | 200 |
| 50 | 400 |
| 60 | 600 |
| 70 | 800 |
| 80 | 1000 |
| 90 | 1300 |
| 100 | 1600 |

Fig. 5

POWER PLANT

BACKGROUND

The field of invention generally relates to a power plant for ground transportation vehicles. More specifically, the present invention relates to a power plant with a turbine.

Power plants currently in use or being considered for use with ground transportation vehicles have significant issues related with their use. Ground transportation vehicle power plants currently use spark ignition (SI), internal combustion engines (ICE), compression ignition (CI) ICEs, hybrids using ICEs combined with battery supported electric motors, and battery supported and fuel cell supported electric motors. Fuels in use include petroleum products gasoline, diesel fuel, kerosene, and jet fuel. Natural gas and renewable natural gas as well as ethanol and methanol are also in use. Biomass fuels, synthetic gas fuels, as well as hydrogen are also being studied with much research directed at providing carbon-neutral fuels that have no net greenhouse gas emissions or carbon footprint. Not all of the fuels, however, may be used on both SI ICEs and CI ICEs. Where battery supported power is the only power available in the case of fully electric motor driven vehicles, the electricity stored in batteries is obtained from the electric grid which in the United States currently is fueled primarily by coal (23%) or natural gas (34%) combustion with air, or nuclear fission (23%).

Presently, about 98% of current and new ground transportation vehicle power plants use ICEs which burn fossil fuels. The combusting of these fossil fuels with air contributes to the overall production of carbon dioxide. Man-made carbon dioxide production may be impacting the global climate and thus should be minimized. Carbon dioxide production of both engine types is continually being reduced, although it may be that the point of diminishing returns could be approaching for both types. There may be little additional design space to explore that could economically yield significant performance improvements.

Vehicle power plants using batteries for electric energy storage are currently being used and continually improved. Basically they vary in how large the batteries are and how the batteries are used. Hybrid vehicles operate using combined battery power and ICE power. While operating on battery power only, these vehicles burn no "fuel" (gasoline, diesel fuel, etc.), only consuming the electrical energy stored in the batteries. This battery-assisted driving is the primary reason these vehicles deliver improved fuel mileage compared to vehicles powered solely by ICEs. Plug-in hybrid vehicles (PHEVs), where the batteries can be recharged by connection to the electric grid, are also available. The plug-in capability, along with adjustments to how the battery and IC engine work together, allows the battery power plant to operate alone for the first 40 or so miles of driving before the ICE starts operating to recharge the battery and assist in moving the vehicle. The batteries used in PHEVs are slightly larger and more expensive than those used in hybrid vehicles.

Entirely electric vehicles that run on batteries charged from connection to the electric grid are also available. Some of the battery electric vehicles (BEVs) have a stated 300 mile driving range while delivering exceptional acceleration but it is unclear just how much of this range is sacrificed if the good acceleration qualities are often exploited and electrically powered vehicle accessories like air conditioning are used. There is also a concern regarding how much a battery pack's performance degrades as discharge/recharge cycles accumulate. Battery packs are also known to exhibit reduced performance when operating in cold temperature. Compared to fuels used in ICE power plants, lithium-ion battery pack energy sources are expensive and require more volume and mass for the same energy and power storage capability. Because a large lithium-ion battery pack is required to achieve reasonable vehicle range, full electric vehicles are significantly more expensive to purchase than a similarly sized ICE powered vehicle, hybrid vehicle, or PHEV. These battery packs are complex requiring specialized cooling systems and controls; hence their reliability and safety is a concern and needs to be proven over a long time period. A primary concern with these vehicles though is the battery recharging time. If it takes several hours to recharge the vehicle sufficiently to permit full range, its usefulness is limited to relatively short trips. Currently, a total battery recharge using a Level 2 charging station at 240 VAC typically takes from 8 to 12 hours but the cost of the electricity acquired compared to comparable acquired gasoline for an ICE vehicle refill is less. A Level 3 "fast" DC charging station can be used that can complete a total battery recharge in about 40 minutes. However, if rapid battery charging is done, it may be that the useful life of the battery is reduced.

There are significant issues regarding the large scale use of batteries for vehicle propulsion, particularly for PHEVs and BEVs. The implications of having a large number of battery supported vehicle power plants that connect to the electric grid is serious. Moving a large portion of the energy source in transportation to electrical generation would require a large increase in electricity generation capacity; a time consuming and expensive undertaking. The mix of possible electrical generation types includes the current conventional plant types fueled by coal, natural gas, and nuclear fission as well as renewable plant types powered by wind and solar photovoltaic. Presently, most new electricity utility-scale generating capacity additions are natural gas fueled and solar photovoltaic. If the new electricity generation capacity is using renewable sources, industry will need to solve the yet unsolved problem of how to economically store large amounts wind generated electricity when there is no wind and store solar generated electricity when there is no sunlight. While electric powered vehicles reduce tailpipe carbon dioxide emissions the overall carbon dioxide emissions depends on the mix of types of electricity generation power plants. Electric powered vehicles are only truly close to being carbon dioxide emissions free when they are charged using renewable electrical power sources like wind or solar photovoltaic. It is unlikely, however, that large numbers of battery electric vehicles will ever be charged using an electrical grid that is completely renewable.

Expanding use of lithium-based battery packs for electrical powered vehicles poses some concerns as well. Lithium-based battery packs require significant amounts of lithium, nickel, and cobalt, all of which are of limited supply just like oil, natural gas, coal, and uranium. Considering that currently only about 0.5% of the world's vehicle fleet are electrical powered vehicles, if large scale movement towards vehicles using lithium-based battery packs were to occur, it is possible that supplies of the raw material needed for the battery packs could become scarce. There are widely divergent views on whether the existing producers of lithium (mostly located in South America and China) could keep pace with a large increase in demand. Some researchers feel the lithium supply would likely be okay but cobalt and particularly nickel may have difficulties in meeting growing demand within the next ten years. For all of these metals, just like any other commodity, as demand increases one can expect prices to increase as well to cover the costs of increasing the supply. An important sidebar to this is currently, lithium, cobalt, and nickel are not being recycled as battery packs are discarded at end-of-life as recycling is very energy intensive and costly.

Another serious concern with the large scale use of batteries for vehicle propulsion has do with their manufacture. Battery cell manufacture generates various adverse secondary environmental impacts (SEI). SEI captures the direct impact on human, terrestrial, and aquatic life, as well as the relative depletion of natural resources that arise from the manufacturing and operation of battery electric vehicles. A full life cycle assessment-beginning with the sourcing of raw materials, through research and development, manufacturing and in-use, to the ultimate disposal of the vehicle is addressed. Studies conclude that while most of the environmental impacts generated from ICE vehicles are localized to the combustion of fuel in the vehicle engine, the manufacturing process for battery electric vehicles generates a much more widely dispersed and damaging set of environmental impacts. The use of heavy metals in the manufacture of lithium-ion battery packs for battery electric vehicles results in a battery electric vehicle generating approximately three times the amount of human toxicity compared to the ICE vehicle for a year 2015 vehicle. This factor is expected to grow from three to upwards of five in the future as the size of battery packs grows to support use on larger vehicles. For the American driver, the decision becomes a trade-off between generating small amounts of pollution where the vehicle is driven versus generating comparatively large amounts of pollution (albeit a different kind) in regions where mining and manufacturing occur.

The cost of owning a battery powered vehicle is also of great concern. Total cost of ownership (TCO) is an important criteria for comparison of ICE and battery electric vehicles. TCO is comprised of two major cost categories: those incurred by the original equipment manufacturer and those incurred once ownership of the vehicle has transferred to the consumer. TCO represents how much owning a vehicle will cost over the lifetime of the vehicle, and it encapsulates all of the cost inputs incurred over the vehicle's lifetime. For costs incurred before the transfer of ownership, all of the cost inputs that go into making a vehicle, from designing, engineering, and manufacturing, as well as warranty cost and overhead are totaled. Once ownership has transferred to the consumer, costs including the in-use costs of operating and maintaining the vehicle, and the end-of-life costs associated with disposing of the vehicle are summed. The TCO for the battery electric vehicle is 44% more expensive than the ICE vehicle (for the year 2015) but the TCO for both vehicle types is expected to converge somewhat within the next ten years as costs related to battery packs decreases with the caveat that geopolitical forces do not drive raw material cost increases for battery manufacture.

A final approach for powering ground transportation vehicles is to use hydrogen fuel cells to supply the electrical power instead of relying on batteries for storing electricity. A small amount of hydrogen fuel cell powered vehicles are currently available for sale in select regions of the United States where the supportive infrastructure is in place. They are relatively expensive but offer a 300 to 360 mile range and can be refueled in five minutes. Fuel cells used in vehicles are polymer electrolyte membrane (PEM) devices. The proton exchange membranes, precious metal catalysts (usually platinum), gas diffusion layers, and bipolar plates used in these fuel cells are expensive accounting for 70% of a system's cost. Fuel cell durability is a major concern as the membranes currently being used tend to degrade while fuel cells cycle on and off as a vehicle starts and stops. The membranes must also be kept hydrated with water in order to function properly. This, along with the fact that a product created by the fuel cell is water, causes concern in that problems exist when using the fuel cells in temperatures below the freezing point of water. Another significant issue with PEM fuel cells is the large size and mass of the on-board hydrogen storage and the related safety concerns. There are also the obvious difficulties and expense associated with generating the necessary infrastructure to create, distribute, store, and dispense hydrogen for fuel cell equipped vehicles. High purity hydrogen is needed for the PEM fuel cell as impurities in either the hydrogen or the air can significantly reduce the fuel cell's efficiency. There are several ways to create the hydrogen needed for the PEM fuel cell. The overall attractiveness of fuel cells for transportation largely depends on how the hydrogen is made. If it is made by electrolysis of water where fossil fuels are used in the electricity generation, the net carbon dioxide emissions may be very high whereas if the electricity generation is done using renewable energy power plants the net carbon dioxide emissions may be very low.

In summary, any new ground transportation vehicle power plant designs should primarily derive from the motivations of reducing fossil fuel use and reducing carbon dioxide emissions while continuing to maintain or improve vehicle performance. However, a vehicle's acceleration, drivability, range/refueling time, handling, and capacity to safely haul people and/or cargo should not be sacrificed at the expense of using an alternate energy source or reducing emissions. And, the total cost of vehicle purchase, operation, and maintenance must also be acceptable to users.

It is obvious that deciding the best power plant type/fuel combination is very complex and dynamic as new information becomes available that affects evaluation results. From what is currently known, it appears as though the best future vehicle power plant should have the following characteristics:

- Exhibit high efficiency (low fuel consumption) over entire load range.
- Be able to use any liquid or gaseous fuel or blends of fuels. This would allow all fuel research and development efforts to proceed in parallel to find the "best" fuel(s) knowing the power plant can use any result.
- Exhibit good energy and power density and specific mass so as to be easily packaged into a vehicle without adding a large mass to the vehicle.
- Use materials that are not rare, are economically and environmentally obtainable, and are recyclable.
- Exhibit long life and durability.

Additionally, in concert with the fuel used, the power plant/fuel combination should:

- Exhibit low emissions with well-to-wheel carbon neutral fuel or zero carbon characteristics.
- Be safely operated.
- Exhibit significant range and minimal refueling (recharging) time.
- Be as much as possible based on renewable energy sources either for generating electricity or fuels.
- Have a competitive total cost of ownership (purchase cost, operating cost, maintenance cost).
- Be applicable to all vehicle types from small sedans to full size trucks and SUVs.

Exhibit acceptable operational characteristics such as acceleration, drivability, handling, and capacity to haul people and/or cargo.

Have minimal need for investment in infrastructure related to creating, distributing, storing, and dispensing the energy used (fuel or electricity).

It is an object of the present invention to provide a high efficiency and low fuel consumption turbine power plant.

SUMMARY OF THE INVENTION

A rotational power plant using a working fluid in a closed-cycle path. The power plant has a single-shaft, compressor and turbine connected together along the path. There is heat source heat exchanger within the path moving from the compressor to the turbine. There is a heat sink and heat exchanger within the path from the turbine to the compressor. There is an Automated Fluid Inventory Management System (AFIMS). The AFIMS includes sensors to measure temperature and pressure of the working fluid at different locations within the path. There is an electronic control unit connected to the AFIMS.

BRIEF DESCRIPTION OF DRAWINGS

FIG. 4 is a data table of functions according to the present invention.

FIG. 5 is a data table of throttle movement according to the present invention.

DETAILED DESCRIPTION

Figure 1:
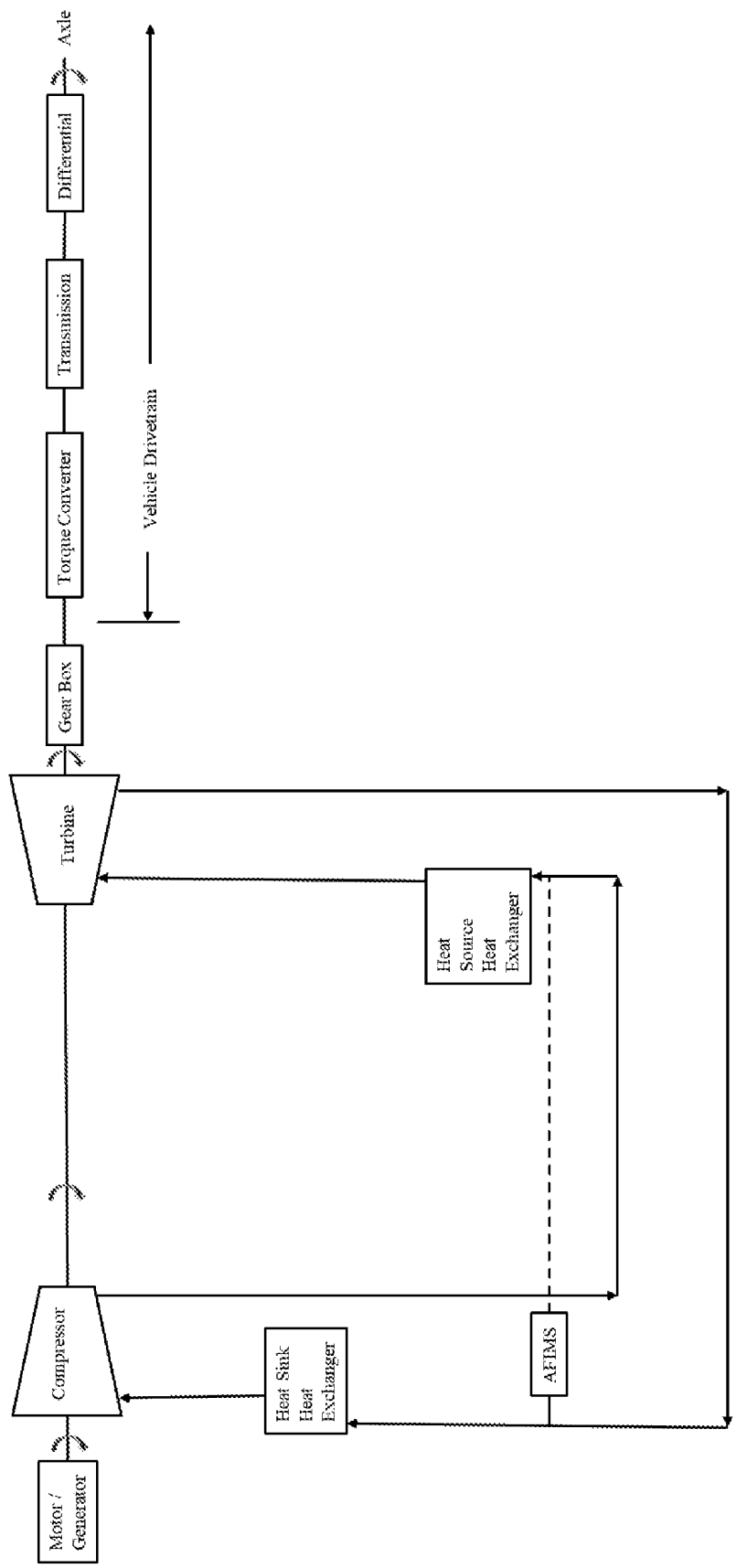
FIG. 1 is a schematic view of the power plant according to the present invention.

The present invention is a power plant that circulates working fluid in a closed-cycle with the ability to quickly manage the fluid mass in the cycle. The power plant is shown coupled to a ground transportation vehicle drivetrain as an example. A schematic of the envisioned power plant is shown in FIG. 1. The closed-cycle approach permits the use of any form of heat source to power the power plant. The closed-cycle power plant is a single-shaft design. The power plant has a single turbine powering the compressor. The power plant accommodates all accessory loads such as electrical load, power assist hydraulic pumps, air conditioning, while also providing output power to drive the vehicle's wheels. The turbine shaft connects to a motor/generator. The motor/generator supplies required vehicle electrical power and is used to start the power plant. The turbine has a gearbox attached to provide the necessary rotational speed reduction to allow the turbine to be compatible with existing vehicle drivetrain designs.

As shown in FIG. 1, working fluid exits the compressor at high pressure then moves through a conduit to the inlet of the heat source heat exchanger. As the fluid moves through the heat source heat exchanger, the fluid acquires heat from a high temperature heat source and exits the heat exchanger at high temperature. The working fluid flows through a conduit from the heat source heat exchanger to the inlet of the turbine. As the fluid passes through the turbine, power is extracted from the flow and transformed into mechanical power in the form of a rotating shaft being turned by the turbine under the influence of the fluid. The working fluid exits the turbine then moves through a conduit to the inlet of the heat sink heat exchanger. As the fluid moves through the heat sink heat exchanger, the fluid transfers heat from the fluid to a low temperature heat sink. Whereby, the fluid exits the heat exchanger at lower temperature. The working fluid flows through a conduit from the heat sink heat exchanger to the inlet of the compressor. As the fluid passes through the compressor, power is added to the flow by transforming the mechanical power of the rotating shaft resulting in compressed fluid and increased fluid pressure.

An Automated Fluid Inventory Management System (AFIMS) together with an electronic control unit uses data from various sensors used to measure the working fluid temperature and pressure within the cycle. The AFIMS and electronic control unit controls the amount of working fluid mass in the cycle, as well as the mass flow rate through the cycle. Managing the working fluid mass and mass flow rate controls the amount of power produced by the power plant.

One of the working fluids that can be utilized inside the closed-cycle of the power plant is carbon dioxide. Carbon dioxide has several unique thermo-physical properties that make it attractive as a working fluid compared to many other fluids. Carbon dioxide is able to exchange energy with surfaces very well, is able to store energy well, and requires low amounts of power to pump it. Additionally, carbon dioxide is non-flammable, non-toxic, easily obtained, and inexpensive.

As shown in FIG. 1, the heat source used with the heat source heat exchanger could be any high temperature source including nuclear or a chemical reaction. Another heat source is the combustion of a fuel with air. The external combustion approach permits the use of any liquid or gaseous fuel or blend of fuels, while affording the possibility of low emissions. This approach also affords the possibility for future use of carbon-neutral fuels as they become available.

Figure 2:
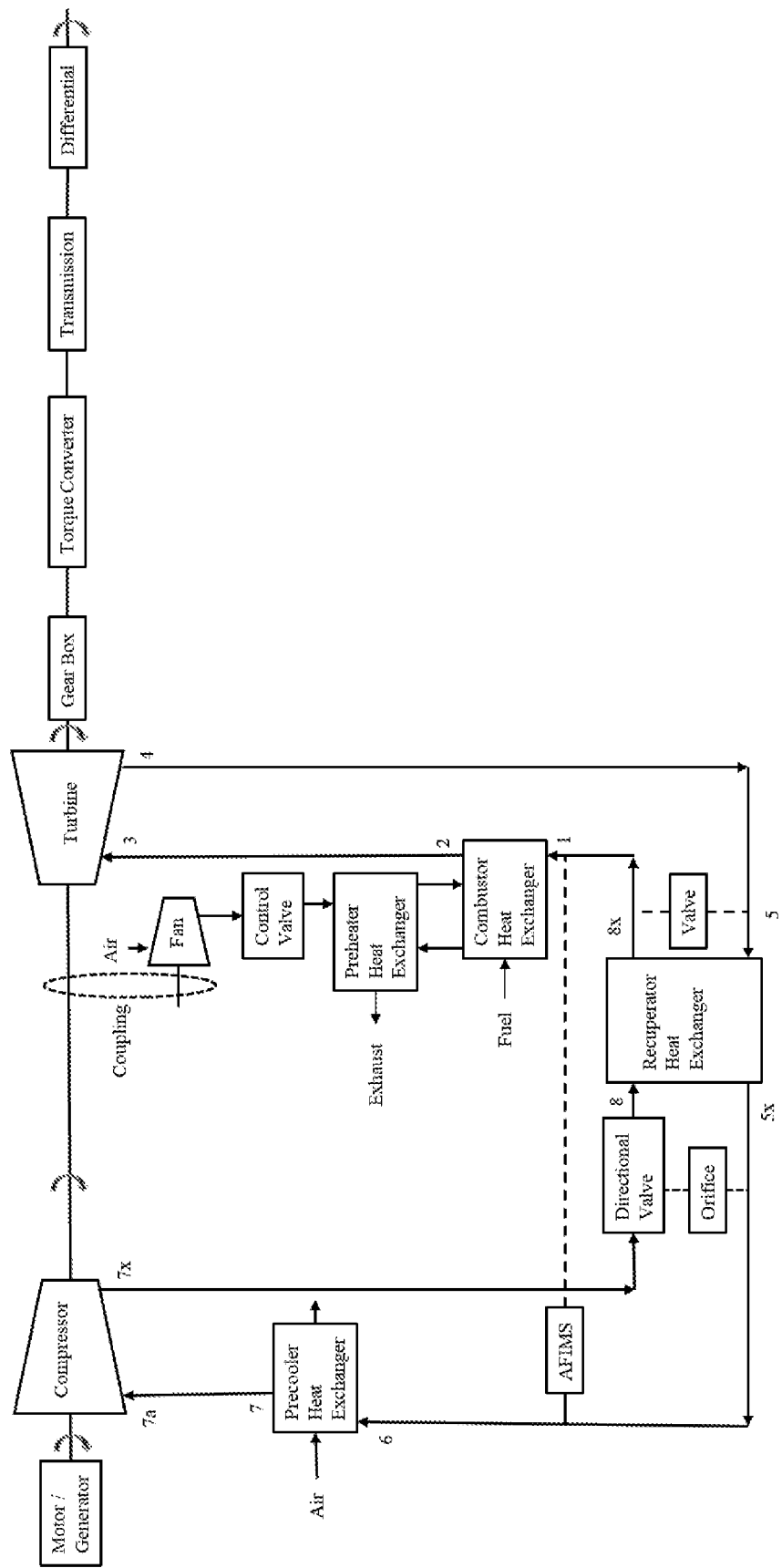
FIG. 2 is a schematic view of the power plant according to the present invention.

FIG. 2 shows a Combustion Air Delivery System (CADS). The CADS provides the air flow necessary for combustion with the fuel. The CADS includes a fan and is coupled to the turbo/compressor shaft. A control valve is shown immediately downstream of the fan. The CADS fan is a single-stage axial flow design. The required combustion air flow will vary with required power plant output power. A variable reduction coupling is used to reduce the turbo/compressor shaft speed to the value needed by the CADS fan to deliver the needed air flow. A power plant electronic control unit (ECU) manages the variable reduction coupling and control valve position as needed using various power plant sensors for input information.

A preheater heat exchanger of FIG. 2 is used to preheat the air from CADS before it enters the combustor heat exchanger. The preheater heat exchanger uses the hot combustion products exiting the combustor to heat the cool air exiting CADS. This action improves the efficiency of the power plant and lowers the temperature of the combustion products that are exhausted to the atmosphere. A recuperator heat exchanger is included in the closed-cycle power plant. The recuperator heat exchanger recycles waste heat available in the carbon dioxide exiting the turbine to warm the carbon dioxide exiting the compressor exit prior to the flow entering the combustor heat exchanger thus improving the power plant efficiency.

The heat sink used with the heat sink heat exchanger of FIG. 1 could be any low temperature sink including a chemical reaction or thermodynamic cycle. In the power plant of FIG. 2, the heat sink is ambient air, which is readily available in ground transportation vehicles. This heat exchanger moves energy from the carbon dioxide exiting the recuperator heat exchanger to ambient air, thus providing the necessary cooling of the carbon dioxide fluid before it enters the compressor.

The turbine used for the power plant is a single-stage axial flow impulse turbine with subsonic inlet flow nozzles. This turbine type exhibits high efficiency at its full load design point and can be operated at partial load with minimal efficiency degradation. This turbine type also has very good power density and specific mass performing power conversion in little space and with small mass. The compressor can be a single-stage mixed flow design. Compared to the centrifugal and axial compressor types, the mixed flow compressor type exhibits the best performance over the wide range of carbon dioxide flow conditions experienced during the operation of the power plant.

Figure 3:
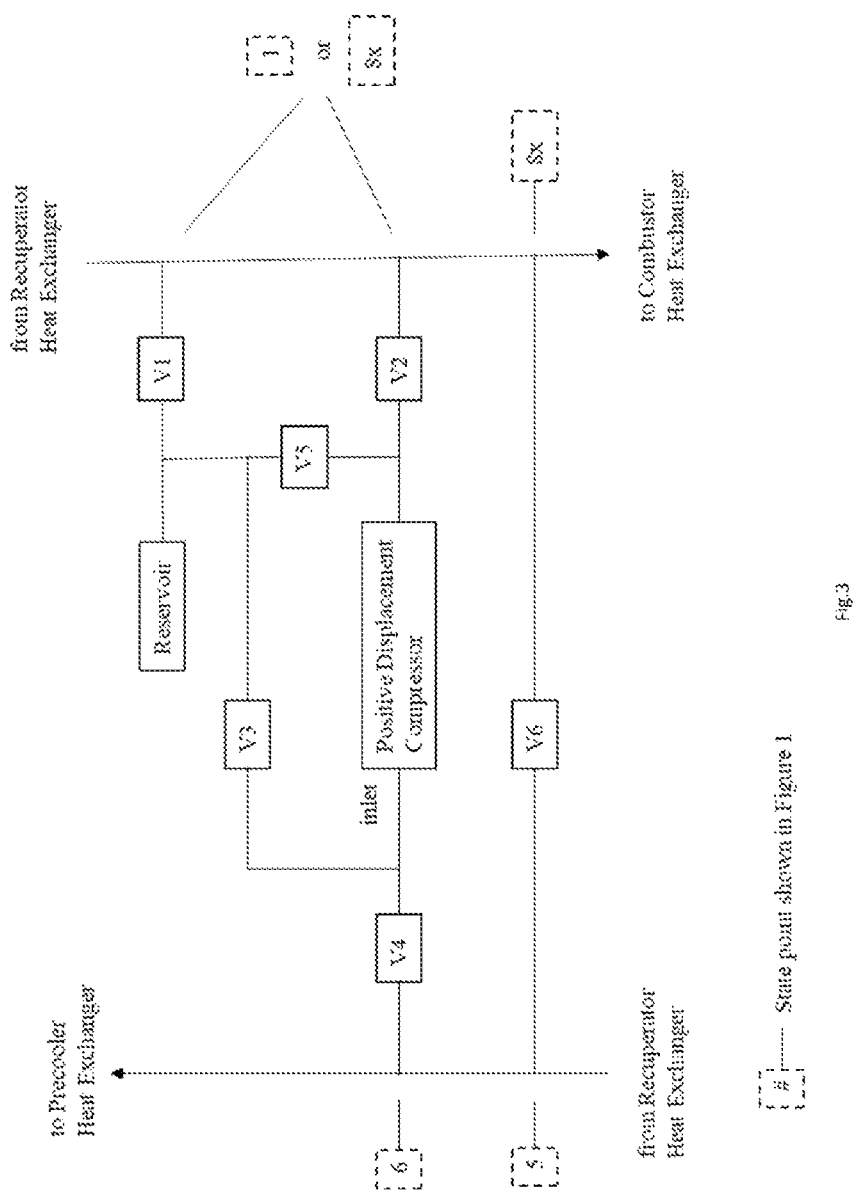
FIG. 3 is a schematic view of the AFIMS according to the present invention.

FIG. 2 shows AFIMS to include the use of the valve connecting location 8x and location 5 as indicated in FIG. 2. A schematic of AFIMS is shown in FIG. 3. AFIMS is a network of electrically actuated on/off valves, a reservoir, and an electrically powered compressor. The compressor of the AFIMS can be a positive displacement type due to the need to deliver flow against large pressure differences. The AFIMS controls the pressures in the carbon dioxide closed-cycle by controlling the amount of carbon dioxide mass in the cycle. Power plant power output is controlled by the carbon dioxide cycle pressures.

FIG. 3 shows the AFIMS connected to the carbon dioxide closed-cycle as shown by the connecting point station numbers that are shown in FIG. 2. The reservoir is sized to contain the carbon dioxide not needed in the closed-cycle when the power plant is at low power output or idle.

FIG. 4 summarizes the various functions provided by AFIMS. Functions 1 and 2 provide for increasing turbine inlet pressure and hence increasing turbine output power. Function 3 increases turbine inlet pressure while decreasing turbine exit pressure thus increasing the turbine nozzles' Mach number and providing increased nozzle flow velocity. Functions 4 and 5 return carbon dioxide to the reservoir for operating the power plant at reduced power levels. Function 6 reduces the pressure difference across the turbine's nozzles thus reducing Mach number and reducing flow through the turbine. Function 6 is the necessary function for quickly reducing power plant output. The power plant electronic control unit (ECU) manages AFIMS operation receiving input from various pressure and temperature sensors in the carbon dioxide closed-cycle, comparing this information with the driver's input for operating the vehicle, then performing one of the six AFIMS functions as needed.

The power plant of FIG. 2 may be used to assist in vehicle braking when descending hills. When requested, the directional valve shown in FIG. 2 activates the redirection of all of the carbon dioxide flow from the compressor outlet through a flow restriction and into the low pressure side of the carbon dioxide cycle and completely bypassing the turbine. The power from the vehicle mass descending the hill is absorbed, at least in part, by the power plant compressor which is generating carbon dioxide flow against a pressure rise.

Power plant control in ground transportation vehicles uses an ECU that receives input from various sensors throughout the power plant and, based on driver input, commands various control elements in the power plant as needed to achieve the desired driver requested power plant performance. Some of the power plant control can be done autonomously by the ECU without the need for any driver interaction. For example, the gear reduction ratio in the variable reduction coupling connecting the combustion air supply fan's shaft to the turbomachinery's shaft, along with the combustion air flow control valve downstream of the fan, is ECU controlled to manage the required fan input power while delivering the correct air flow necessary to provide combustor exit products at 1900° F. (+/−50° F.) given the fuel flow rate that is being delivered to the combustor.

The ECU coordinates the combustion air flow rate and fuel flow rate to achieve the target combustor products exit temperature along with the target temperature for the carbon dioxide exiting the combustor heat exchanger. The target combustor exit temperature for the carbon dioxide is currently a function of the maximum carbon dioxide cycle pressure. For maximum cycle pressures less than 1000 psia, a target temperature of 1100° F. is used; at 1000 psia or above 1000° F. is used. This is done to provide increased factors of safety for the hardware in the carbon dioxide cycle when the cycle is at high temperature and pressure. A maximum allowable carbon dioxide cycle pressure of 1600 psia and a minimum allowable cycle operational pressure of 40 psia are envisioned for when the power plant is operating.

Additionally, the carbon dioxide cycle pressures must be managed so as to protect the compressor from surge and choking and keep the turbine nozzles' exit subsonic. The ECU receives input from various sensors in the power plant regarding turbine (and compressor) shaft speed, vehicle speed, pressures, and temperatures and uses AFIMS to manage all of these limits by adding or removing carbon dioxide from the cycle or redistributing it in the cycle as required. Working in conjunction with the overall power plant ECU, an electronically controlled automatic transmission's electronic control unit (ECU-AT) uses the power plant performance information from sensors to decide when to change gear reduction and limit turbine shaft speed to a maximum of 65,000 rpm. The ECU also autonomously manages the fans used to draw cooling air through the precooler activating them whenever the carbon dioxide temperature leaving the precooler exceeds 130° F.

The power plant control in the motor vehicle is achieved using control states and modes. A control state is used where a constant or nearly constant power plant operation is occurring. A control mode is used when there is a transition from one control state to another control state. The following describes states and modes in detail. Off State mode is when the power plant is not operating and the ground transportation vehicle is parked with no systems active. When in Off State, all AFIMS valves are closed. The required carbon dioxide mass necessary to leave a maximum pressure in the carbon dioxide cycle of 40 psia has been removed from the cycle and placed in the AFIMS reservoir. The ECU monitors carbon dioxide cycle pressure and will quickly cycle open close valve 1 in AFIMS if needed to maintain a minimum cycle pressure of 20 psia, as shown in FIG. 3. Alternately, the need for an active ECU may possibly be avoided by using a strictly mechanical means of maintain a minimum cycle pressure of 20 psia. Maintaining this minimum cycle pressure is necessary to prevent cycle pressure from possibly falling below the ambient air pressure and allowing air to enter the carbon dioxide cycle. Pressure decline in the cycle could be due to ambient temperature decrease or possibly carbon dioxide leakage from the cycle.

Startup Mode transitions the power plant from Off State to a special case of the Constant Power Plant Output Power State, which is power plant idle. The ECU commands several actions to initiate power plant operation. The motor/generator is activated as a motor to bring the turboshaft to a predetermined shaft speed. AFIMS is instructed to bring turbine inlet and turbine exit to predetermined pressures commensurate with "idle" power plant operation. The variable reduction coupling and combustion air control valve are adjusted to give the desired combustor fan rotational speed. The fuel flow for "idle" is activated. The combustor's ignitor is activated then turned off once continuous combustion in combustor is established. The motor/generator switches to generator role once stable power plant "idle" is established.

Power Output mode increases the output power by increasing turbine inlet pressure, which requires carbon dioxide mass being added to the cycle at a point near the combustor heat exchanger inlet. The position of the throttle of the vehicle by the vehicle's driver determines what turbine inlet pressure is to be targeted. FIG. 5 outlines an estimate of throttle movement and target turbine inlet pressure and is stored in the ECU as a performance table. When the vehicle's driver increases the throttle, the ECU commands open valve 1 in the AFIMS allowing carbon dioxide flow out of the AFIMS reservoir and into the cycle; or instead, depending on the relative AFIMS reservoir and cycle pressures, activates the positive displacement compressor in AFIMS while setting the required valve conditions to pump carbon dioxide out of the reservoir into the cycle.

As turbine inlet pressure increases, the power plant power output increases. As the desired power output is approached, the vehicle's driver reduces the throttle to establish a new position with its commensurate new target turbine inlet pressure. At this point, the ECU can either try to achieve the new turbine inlet pressure target by having AFIMS move mass back into its reservoir, or it can reduce turbine inlet pressure by commanding open valve 6 in AFIMS which moves carbon dioxide mass to the lower pressure side of the cycle decreasing the pressure difference across the turbine's nozzles resulting in decreased flow to the turbine thus decreased output power.

Experimentation will disclose which of these approaches, or combination of approaches, works best. For a given turbine inlet temperature and drivetrain transmission gear reduction ratio, there is only one combination of turbine inlet pressure and ratio of turbine exit to inlet pressure where the compressor is perfectly matched to the rest of the power plant in terms of mass flow rate supplied at a specific compressor shaft speed. When increasing power plant power the compressor temporarily will not be synchronized with the rest of the power plant but care still must be taken to keep it from approaching surge or choking. Care must also be taken to manage the pressure ratio across the turbine nozzles so as to keep the nozzles' exit from choking.

Upon arriving at a desired constant power plant output the ECU seeks to establish the turbine inlet pressure and turbine exit to inlet pressure ratio at the levels required for the given turbine shaft speed and desired power plant power output. During the power output increase, the ECU-AT uses performance information such as vehicle speed, turbine (and compressor) shaft speed, turbine inlet and exit pressures, and throttle position to determine whether a change in transmission gear reduction is needed.

Constant Power Output state is applied when the vehicle's driver maintains a constant throttle position, thus requesting constant power plant power output. As mentioned earlier, for a given turbine inlet temperature and drivetrain transmission gear reduction ratio, there is only one combination of turbine inlet pressure and ratio of turbine exit to inlet pressure where the power plant is balanced and the compressor is perfectly matched to the rest of the power plant in terms of mass flow rate supplied at a specific compressor shaft speed. The ECU maintains the turbine inlet pressure and turbine exit to inlet pressure ratio at the levels required for the given turbine shaft speed and desired power plant power output. Power output is quickly decreased by commanding open valve 6 in AFIMS to move carbon dioxide mass to the lower pressure side of the cycle thus decreasing the pressure difference across the turbine's nozzles resulting in decreased flow to the turbine hence decreased output power, as shown in FIG. 3. The driver's request for reduced power by reducing the throttle also results in the ECU targeting a reduced turbine inlet pressure. The ECU commands AFIMS valves and the AFIMS compressor as needed to move carbon dioxide from the cycle into the AFIMS reservoir to attain the new cycle pressure target.

Shutdown mode transitions the power plant from a special case of the Constant Power Plant Output Power State (idle state) to the Off State, where fuel flow is stopped. The required carbon dioxide mass necessary to leave a maximum pressure in the carbon dioxide cycle of 40 psia is removed from the cycle and placed in the AFIMS reservoir. The AFIMS compressor will be activated and the necessary AFIMS valves opened to pump the carbon dioxide from the cycle to the reservoir. The motor/generator switches to motor role for a period of time to allow combustion air flow to cool down the combustor and combustor heat exchanger after which the motor/generator is turned off, the variable reduction coupling for the combustion air fan is uncoupled and the combustion air control valve is set to its "off" value.

The power plant may be used to assist in vehicle braking when descending hills. When activated, the braking directional valve, shown in FIG. 2, activates redirecting all of the carbon dioxide flow from the compressor outlet through a flow restriction and into the low pressure side of the carbon dioxide cycle completely bypassing the turbine. During this brake assist, there is no fuel flow. The power from the vehicle mass descending the hill at some speed is absorbed, at least in part, by the power plant compressor which is generating carbon dioxide flow against a pressure rise.

The power plant design lends itself to potential hybrid operations using energy storage elements that exist in the power plant. Energy is stored in the AFIMS reservoir as high pressure carbon dioxide and, when the power plant has been operating, in the high temperatures of the recuperator material and combustor heat exchanger material. Thermal storage in the combustor heat exchanger inlet could be augmented using electrical heaters powered by the power plant battery that is regenerated during power plant decreased power output events. Battery storage can be sized as desired to supply the electrical needs of the vehicle's hotel loads while powering the motor/generator and AFIMS compressor. Supplying the power needed for the power plant compressor by using the motor/generator and additionally providing carbon dioxide compression using the electrically powered AFIMS compressor, the power plant can generate low levels of power to the wheels without burning any fuel. This type of hybrid operation could be useful for supporting transient periods of low level vehicle acceleration or low speed vehicle performance.

As anyone practicing the art can appreciate, there may be other ways to design, manufacture, assemble, and operate the various invention elements. The invention elements may be produced using materials commonly used in the trade and may be assembled in such a manner as to yield a most cost-effective or other desired solution. The present invention is well suited to satisfy the objectives and achieve the goals and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention.

The power plant solution uses an external combustion closed-cycle as this permits the use of any liquid or gaseous fuel or blend of fuels while affording the possibility of low emissions and net-zero or carbon neutral operation. The expander in the closed-cycle that converts thermodynamic power into mechanical power is a single-stage axial flow impulse turbine. This turbine type exhibits high efficiency at its full load design point and can be operated at partial load with minimal efficiency degradation. This turbine type also has excellent power density and specific mass performing power conversion in little space and with small mass. The closed-cycle design provides inventory control which greatly improves overall power plant efficiency at lower loads. The working fluid used in the closed-cycle is carbon dioxide. The closed-cycle includes heat exchangers for the purpose of maximizing cycle efficiency, acquiring heat from the external combustor, and rejecting waste heat to the environment. The closed-cycle power plant is a single-shaft design where a single turbine powers the compressor and accommodates all accessory loads (electrical load, power assist hydraulic pumps, air conditioning) while also providing output power to drive the vehicle's wheels. The turbine shaft connects to a motor/generator. The motor/generator supplies required vehicle electrical power and is used to start the power plant. The turbine has a gearbox attached that provides the necessary rotational speed reduction to make the turbine compatible with existing ground transportation vehicle drivetrain design. Power plant operation is controlled using various valves, sensors, and electronics.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

I claim:

1. A power plant for providing rotational power to a device comprising:
   a working fluid;
   a conduit throughout said power plant providing a closed-cycle path for said working fluid;
   a single-shaft to provide said rotational power;
   a compressor connected to said single-shaft and connected within said path;
   a single turbine attached to said compressor by said single-shaft, said turbine connected within said path;
   a heat source heat exchanger within said path moving from said compressor to said turbine;
   a heat sink heat exchanger within said path from said turbine to said compressor;
   wherein said working fluid exits said compressor at high pressure then moves through said path of said conduit to an inlet of said heat source heat exchanger, as said working fluid moves through said heat source heat exchanger, said working fluid acquires heat from a high temperature heat source of said heat source heat exchanger and exits said heat source heat exchanger at a higher temperature;
   wherein said working fluid flows through said conduit of said path from said heat source heat exchanger to an inlet of said turbine, as said working fluid passes through said turbine, power is extracted from flow of said working fluid and transformed into mechanical power in the form of rotation of said single shaft being turned by said turbine under influence of said working fluid;
   wherein said working fluid exits said turbine and moves through said conduit of said path to an inlet of said heat sink heat exchanger, as said working fluid moves through said heat sink heat exchanger, said working fluid transfers heat from said working fluid to a low temperature heat sink, wherein said working fluid exits said heat sink heat exchanger at a lower temperature;
   wherein said working fluid flows through said conduit of said path from said heat sink heat exchanger to an inlet of said compressor, wherein as said working fluid passes through said compressor, power is added to said flow of said working fluid by transforming the mechanical power of said rotating single shaft that results in a compression of said working fluid and increasing fluid pressure of said working fluid;
   an Automated Fluid Inventory Management System (AFIMS), said AFIMS including sensors to measure temperature and pressure of said working fluid at different locations within said path;
   an electronic control unit (ECU) connected to said AFIMS;
   said AFIMS and said electronic control unit controlling mass of said working fluid in said path and mass flow rate of said working fluid through said path in order to control amount of power produced by said power plant;
   wherein said heat source heat exchanger includes a Combustion Air Delivery System (CADS), said CADS providing necessary air flow for combustion with fuel in said heat source heat exchanger, said CADS including a fan that is single-stage axial flow coupled to said single shaft, wherein there is a control valve immediately downstream of said fan, wherein said air flow for combustion varies with required power plant output power, wherein there is a variable reduction coupling used to reduce the speed of the single shaft to a value needed by said fan to deliver needed air flow, said ECU connected to manage said variable reduction coupling and control valve position as needed using said sensors of said AFIMS for input information;
   wherein said heat source heat exchanger includes a preheater heat exchanger to preheat air from said CADS before the air enters said heat source heat exchanger, said preheater heat exchanger using hot combustion products exiting said heat source heat exchanger to heat air exiting said CADS;
   further including a recuperator heat exchanger included within said path, said recuperator heat exchanger recycling waste heat available in said working fluid exiting said turbine to warm said working fluid exiting said compressor prior to flow of said working fluid entering said heat source heat exchanger to improve power plant efficiency;
   wherein said heat sink heat exchanger inputs ambient air to transfer energy from said working fluid exiting said recuperator heat exchanger to said ambient air, thus providing cooling of said working fluid entering said compressor;
   wherein said compressor is a single-stage compressor having mixed flow;
   wherein said AFIMS includes on/off valves within said path, a working fluid reservoir and an AFIMS compressor, wherein said AFIMS controls pressures of the working fluid in the closed cycle path by controlling the working fluid mass using said valves and wherein said reservoir is sized to contain said working fluid not needed in said closed-cycle path; and wherein there is a valve V1 between said reservoir and said recuperator heat exchanger, wherein there is a valve V2 between an exit of said AFIMS compressor and said recuperator heat exchanger, wherein there is a valve V4 between an inlet of said AFIMS compressor and said recuperator heat exchanger, wherein there is a valve V3 between said valve V4 and said AFIMS compressor that leads to said reservoir, wherein there is a valve V5 between said AFIMS compressor and said valve V2 that leads to said reservoir, and wherein there is a valve V6 between said recuperator heat exchanger and said heat source heat exchanger.

2. The power plant of claim 1, wherein when said Valve V1 is open and said Valves V2, V3, V4, V5, V6 are closed, mass of the working fluid is injected from the reservoir into said path to provide for increasing turbine inlet pressure and hence increasing turbine output power, wherein when said Valves V2, V3 are open and said Valves V1, V4, V5, V6 are closed, mass of the working fluid is pumped from the reservoir into said path to provide for increasing turbine inlet pressure and hence increasing turbine output power, wherein when said Valves V2, V4 are open and said Valves V1, V3, V5, V6 are closed, mass of the working fluid is pumped from said heat sink heat exchanger inlet to increase turbine inlet pressure while decreasing turbine exit pressure thus increasing the turbine nozzles' Mach number and providing increased nozzle flow velocity, wherein when said Valves V4, V5 are open and said Valves V1, V2, V3, V6 are closed, said reservoir is filled using said AFIMS compressor for operating said power plant at reduced power levels, wherein when said Valves V3, V4 are open and said Valves V1, V2, V5, V6 are closed, said reservoir is filled without using said AFIMS compressor for operating said power plant at reduced power levels, wherein when said Valve V6 is open and said Valves V1, V2, V3, V4, V5 are closed, mass of said working fluid is moved from an exit of said recuperator heat exchanger to an inlet of said recuperator heat exchanger to reduce the pressure difference across the turbine's nozzles thus reducing Mach number and reducing flow through the turbine, and said ECU receiving input from pressure and temperature sensors in said path and managing AFIMS operation.

3. A method of providing rotational power to a device from a power plant comprising:
manipulating a working fluid in a closed-cycle path;
providing a single-shaft to provide said rotational power;
providing a compressor connected to the single-shaft and connected within the path to compress the working fluid;
providing a single turbine attached to the compressor by the single-shaft and using the working fluid to rotate the turbine connected within the path;
using a heat source heat exchanger connected within the path of the working fluid that moves from the compressor to the turbine;
using a heat sink heat exchanger connected within the path of the working fluid that moves from the turbine to the compressor;
heating the working fluid as the working fluid exits the compressor at high pressure then moves through the path of the conduit to an inlet of the heat source heat exchanger, as the working fluid moves through the heat source heat exchanger, the working fluid acquires heat from a high temperature heat source of the heat source heat exchanger and exits the heat source heat exchanger at a higher temperature, extracting power from the working fluid as the working fluid flows through the conduit of the path from the heat source heat exchanger to an inlet of the turbine, as the working fluid passes through the turbine, power is extracted from flow of the working fluid and transformed into mechanical power in the form of rotation of the single shaft being turned by the turbine under influence of the working fluid;

transferring heat from the working fluid as the working fluid exits the turbine and moves through the conduit of the path to an inlet of the heat sink heat exchanger, as the working fluid moves through the heat sink heat exchanger, the working fluid transfers heat from the working fluid to a low temperature heat sink, wherein the working fluid exits the heat sink heat exchanger at a lower temperature;

flowing the working fluid through the conduit of the path from the heat sink heat exchanger to an inlet of the compressor, wherein power is added to the flow of the working fluid as the working fluid passes through the compressor by transforming the mechanical power of the rotating single shaft that results in a compression of the working fluid and increasing fluid pressure of the working fluid;

using an Automated Fluid Inventory Management System (AFIMS) that includes sensors to measure temperature and pressure of the working fluid at different locations within the path to control the temperature and pressure of the working fluid;

connecting an electronic control unit (ECU) to the AFIMS for controlling mass of the working fluid in the path and mass flow rate of the working fluid through the path in order to control amount of power produced by the power plant;

using carbon dioxide as the working fluid; and providing a valve V1 between a reservoir and a recuperator heat exchanger, providing a valve V2 between an exit of a AFIMS compressor and said recuperator heat exchanger, providing a valve V4 between an inlet of said AFIMS compressor and said recuperator heat exchanger, providing a valve V3 between said valve V4 and said AFIMS compressor that leads to said reservoir, providing a valve V5 between said AFIMS compressor and said valve V2 that leads to said reservoir, and providing a valve V6 between said recuperator heat exchanger and said heat source heat exchanger.

4. The method of claim 3, further comprising using said ECU to receive input from pressure and temperature sensors in said path and manage AFIMS operation; wherein when said Valve V1 is open and said Valves V2, V3, V4, V5, V6 are closed, mass of the working fluid is injected from the reservoir into said path to provide for increasing turbine inlet pressure and hence increasing turbine output power, wherein when said Valves V2, V3 are open and said Valves V1, V4, V5, V6 are closed, mass of the working fluid is pumped from the reservoir into said path to provide for increasing turbine inlet pressure and hence increasing turbine output power, wherein when said Valves V2, V4 are open and said Valves V1, V3, V5, V6 are closed, mass of the working fluid is pumped from said heat sink heat exchanger inlet to increase turbine inlet pressure while decreasing turbine exit pressure thus increasing the turbine nozzles' Mach number and providing increased nozzle flow velocity, wherein when said Valves V4, V5 are open and said Valves V1, V2, V3, V6 are closed, said reservoir is filled while using said AFIMS compressor for operating said power plant at reduced power levels, wherein when said Valves V3, V4 are open and said Valves V1, V2, V5, V6 are closed, said reservoir is filled without using said AFIMS compressor for operating said power plant at reduced power levels, wherein when said Valve V6 is open and said Valves V1, V2, V3, V4, V5 are closed, mass of said working fluid is moved from an exit of said recuperator heat exchanger to an inlet of said recuperator heat exchanger to reduce the pressure difference across the turbine's nozzles thus reducing Mach number and reducing flow through the turbine.

\* \* \* \* \*